United States Patent
Saito et al.

(10) Patent No.: US 10,673,267 B2
(45) Date of Patent: Jun. 2, 2020

(54) CHARGE AND DISCHARGE CONTROL CIRCUIT AND BATTERY DEVICE

(71) Applicant: ABLIC Inc., Chiba-shi, Chiba (JP)

(72) Inventors: Hiroshi Saito, Chiba (JP); Kazuaki Sano, Chiba (JP); Takahiro Kashiuchi, Hamamatsu (JP); Akihiko Suzuki, Hamamatsu (JP); Takahiro Kuratomi, Hamamatsu (JP)

(73) Assignee: ABLIC INC., Chiba (JP)

( * ) Notice: Subject to any disclaimer, the term of this patent is extended or adjusted under 35 U.S.C. 154(b) by 344 days.

(21) Appl. No.: 15/918,362

(22) Filed: Mar. 12, 2018

(65) Prior Publication Data
US 2018/0269705 A1 Sep. 20, 2018

(30) Foreign Application Priority Data
Mar. 15, 2017 (JP) ................. 2017-050555

(51) Int. Cl.
*H02J 7/00* (2006.01)
(52) U.S. Cl.
CPC ............ *H02J 7/0072* (2013.01); *H02J 7/008* (2013.01); *H02J 7/0024* (2013.01); *H02J 7/0063* (2013.01); *H02J 7/0068* (2013.01); *H02J 2007/0067* (2013.01)
(58) Field of Classification Search
CPC ........ H02J 7/0024; H02J 7/0072; H02J 7/008; H02J 7/0068; H02J 7/0063; H02J 2007/0067
USPC ...................................................... 320/128
See application file for complete search history.

(56) References Cited

U.S. PATENT DOCUMENTS

| | | | | |
|---|---|---|---|---|
| 4,937,568 | A * | 6/1990 | Nakanishi | H03M 9/00 326/93 |
| 6,222,346 | B1 * | 4/2001 | Mori | H02J 7/0031 320/134 |
| 6,750,677 | B2 * | 6/2004 | Sumita | H03K 19/0963 326/94 |
| 8,218,377 | B2 * | 7/2012 | Tandon | G11C 16/12 327/333 |
| 10,361,570 | B2 * | 7/2019 | Ono | H02J 7/0019 |
| 10,559,968 | B2 * | 2/2020 | Saito | H02J 7/0047 |

(Continued)

FOREIGN PATENT DOCUMENTS

JP        5524311 B2    6/2014

*Primary Examiner* — M Baye Diao
(74) *Attorney, Agent, or Firm* — Brinks Gilson & Lione

(57) ABSTRACT

A charge and discharge control circuit operates between a first and a second power supply voltage of the secondary battery, and is used in a cascade-connection to the second charge and discharge control circuit having the same configuration, and includes an output circuit and an output terminal for discharge control, an input circuit and an input terminal for discharge control, and a control circuit. The input circuit includes a first MOS transistor having a source terminal connected to the input terminal and a gate terminal for receiving the first power supply voltage, a second MOS transistor having a drain terminal and a gate terminal connected to a drain terminal of the first MOS transistor and a source terminal for receiving the second power supply voltage, and a third MOS transistor current-mirror-connected to the second MOS transistor and having a drain terminal for supplying a discharge control input signal.

15 Claims, 5 Drawing Sheets

(56) References Cited

U.S. PATENT DOCUMENTS

| | | | |
|---|---|---|---|
| 10,573,936 B2* | 2/2020 | Imaizumi | G01R 31/3835 |
| 2010/0060084 A1 | 3/2010 | Tange et al. | |
| 2010/0097360 A1* | 4/2010 | Cho | G09G 3/3283 |
| | | | 345/205 |

* cited by examiner

CHARGE AND DISCHARGE CONTROL CIRCUIT AND BATTERY DEVICE

RELATED APPLICATIONS

This application claims priority under 35 U.S.C. § 119 to Japanese Patent Application No. 2017-050555 filed on Mar. 15, 2017, the entire content of which is hereby incorporated by reference.

BACKGROUND OF THE INVENTION

1. Field of the Invention

The present invention relates to a charge and discharge control circuit and a battery device.

2. Description of the Related Art

Hitherto, there has been known a battery device including the first charge and discharge control circuit (the first battery protection IC), the second charge and discharge control circuit (the second battery protection IC) cascade-connected to the first charge and discharge control circuit, secondary batteries (batteries), a MOS transistor for discharge control (FET for discharge control) configured to control discharge from the secondary batteries, a MOS transistor for charge control (FET for charge control) configured to control charge to the secondary batteries, a resistor for connecting between an input terminal for discharge control of the first charge and discharge control circuit and an output terminal for discharge control of the second charge and discharge control circuit, and a resistor for connecting between an input terminal for charge control of the first charge and discharge control circuit and an output terminal for charge control of the second charge and discharge control circuit (for example, see Japanese Patent No. 5524311).

In the battery device described in Japanese Patent No. 5524311, a large number of secondary batteries are connected in series. The plurality of charge and discharge control circuits is cascade-connected to each other so as to operate within the predetermined withstanding voltages of the charge and discharge control circuits (battery protection ICs). An output terminal for discharge control of the first charge and discharge control circuit is connected to the MOS transistor for discharge control, and an output terminal for charge control of the first charge and discharge control circuit is connected to the MOS transistor for charge control. The input terminal for discharge control of the first charge and discharge control circuit is connected to the output terminal for discharge control of the second charge and discharge control circuit. Further, the input terminal for charge control of the first charge and discharge control circuit is connected to the output terminal for charge control of the second charge and discharge control circuit.

As a result, the battery device described in Japanese Patent No. 5524311 can control charge and discharge of the secondary batteries while the withstand voltages of the plurality of charge and discharge control circuits are ensured.

Incidentally, in the battery device illustrated in FIG. 1 of Japanese Patent No. 5524311, currents always flow through a current path including a constant current source 115b and a clamp circuit 121 and through a current path including a constant current source 115c and an NMOS transistor 120. The battery device described in Japanese Patent No. 5524311 therefore requires reduction in power consumption of the charge and discharge control circuit.

SUMMARY OF THE INVENTION

In view of this, the present invention has an object to provide a charge and discharge control circuit and a battery device which are capable of reducing power consumption of the charge and discharge control circuit.

In one embodiment of the present invention there is provided a charge and discharge control circuit configured to control charge and discharge of the first secondary battery and to operate between the first power supply voltage and the second power supply voltage of the first secondary battery, the charge and discharge control circuit being configured to be used in a cascade-connection to the second charge and discharge control circuit configured to control charge and discharge of the second secondary battery connected in series to the first secondary battery, and to operate between the first power supply voltage and the second power supply voltage of the second secondary battery, the charge and discharge control circuit, including:

an output circuit for discharge control configured to output a discharge control signal for controlling a MOS transistor for discharge control, the discharge control signal corresponding to the first power supply voltage of the first secondary battery;

an output terminal for discharge control connected to an output of the output circuit for discharge control;

a control circuit configured to control the output circuit for discharge control;

an input circuit for discharge control configured to output a discharge control input signal to the control circuit; and an input terminal for discharge control connected to the input circuit for discharge control, and connected to an output terminal for discharge control of the second charge and discharge control circuit, the input circuit for discharge control including:
 a first MOS transistor of a first conductivity type having a source terminal connected to the input terminal for discharge control and a gate terminal for receiving the first power supply voltage of the secondary battery;
 a second MOS transistor of a second conductivity type having a drain terminal and a gate terminal that are connected to a drain terminal of the first MOS transistor and a source terminal for receiving the second power supply voltage of the secondary battery; and
 a third MOS transistor of the second conductivity type current-mirror-connected to the second MOS transistor, and having a drain terminal for outputting the discharge control input signal.

In another embodiment of the present invention there is provided a battery device, including:
 the charge and discharge control circuit shown above;
 the second charge and discharge control circuit;
 the secondary battery;
 a discharge control switch configured to control discharge from the secondary battery; and
 a charge control switch configured to control charge to the secondary battery.

According to the present invention, when a signal corresponding to the second power supply voltage of the second secondary battery which is a signal for inhibiting discharge is supplied from the output terminal for discharge control of the second charge and discharge control circuit, the first MOS transistor in the input circuit for discharge control which has received the signal at the source terminal thereof is turned off. Thus, a current path in the input circuit for discharge control is disconnected, and hence the power consumption of the charge and discharge control circuit can be reduced.

DETAILED DESCRIPTION OF THE EMBODIMENTS

Now, referring to the accompanying drawings, a description is given to an embodiment of the present invention.

Figure 1:
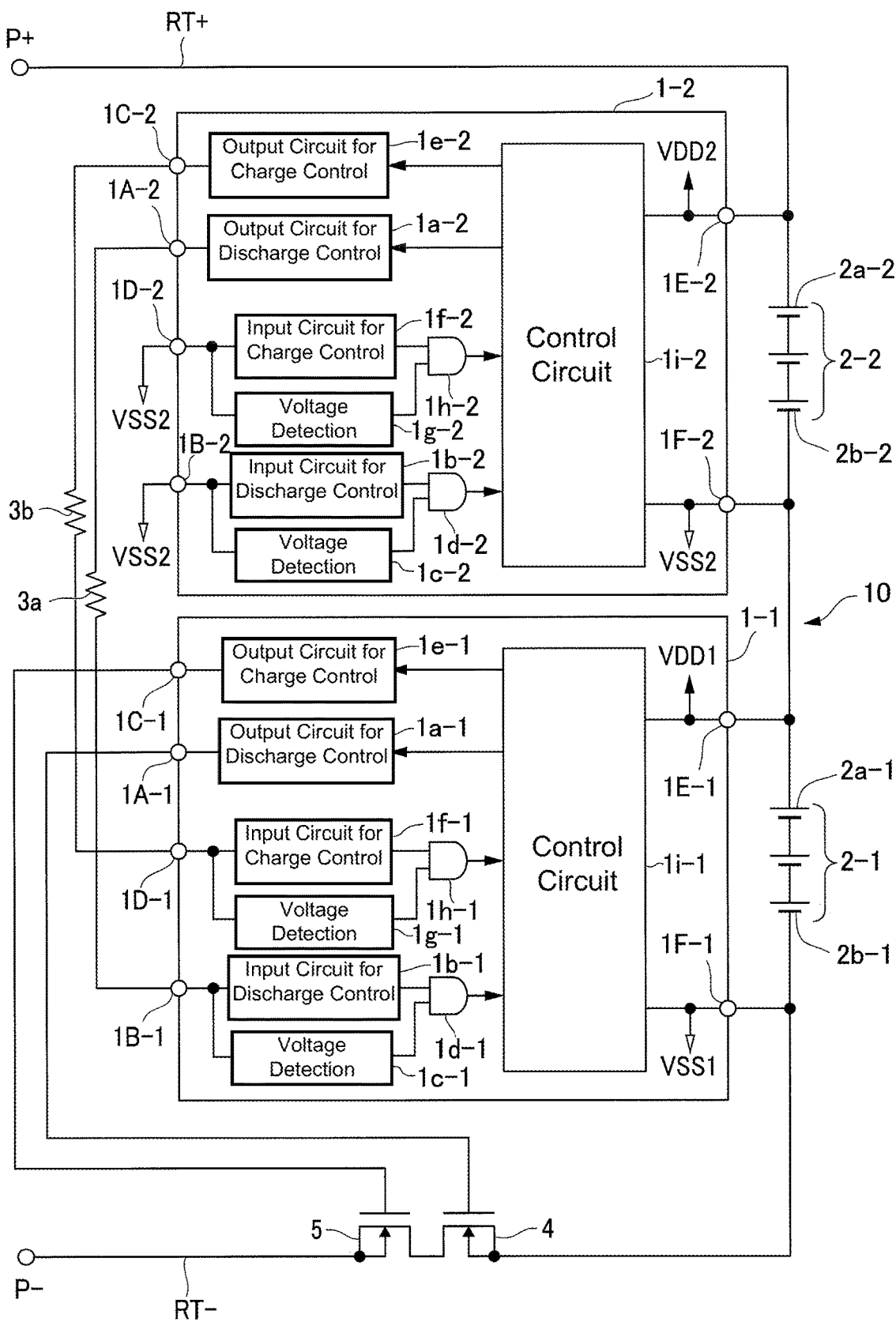
FIG. 1 is a diagram for illustrating an example of a battery device including a charge and discharge control circuit according to an embodiment of the present invention.

FIG. 1 is a diagram for illustrating an example of a battery device 10 including a charge and discharge control circuit 1-1 according to the embodiment of the present invention.

In the example illustrated in FIG. 1, the battery device 10 includes charge and discharge control circuits 1-1 and 1-2, secondary batteries 2-1 and 2-2, charge and discharge paths RT+ and RT−, external terminals P+ and P−, resistors 3a and 3b, a MOS transistor 4 for discharge control, and a MOS transistor 5 for charge control. The MOS transistor 4 for discharge control controls discharge from the secondary batteries 2-1 and 2-2. The MOS transistor 5 for charge control controls charge to the secondary batteries 2-1 and 2-2.

The charge and discharge path RT+ is connected to a first electrode 2a-2 of the secondary battery 2-2. The external terminal P+ is formed in the charge and discharge path RT+. The charge and discharge path RT− is connected to a second electrode 2b-1 of the secondary battery 2-1. The external terminal P− is formed in the charge and discharge path RT−. A second electrode 2b-2 of the secondary battery 2-2 is connected to a first electrode 2a-1 of the secondary battery 2-1. A charger and a load (not shown) are connected between the external terminal P+ and the external terminal P−.

The MOS transistor 4 for discharge control and the MOS transistor 5 for charge control are arranged in the charge and discharge path RT−. A source terminal of the MOS transistor 4 for discharge control is connected to the second electrode 2b-1 of the secondary battery 2-1. A drain terminal of the MOS transistor 4 for discharge control is connected to a drain terminal of the MOS transistor 5 for charge control. A source terminal of the MOS transistor 5 for charge control is connected to the external terminal P−.

In the example illustrated in FIG. 1, the charge and discharge control circuit 1-1 includes an output terminal 1A-1 for discharge control, an input terminal 1B-1 for discharge control, an output terminal 1C-1 for charge control, an input terminal 1D-1 for charge control, a first power supply terminal 1E-1, a second power supply terminal 1F-1, an output circuit 1a-1 for discharge control, an input circuit 1b-1 for discharge control, a voltage detector 1c-1, a logic circuit 1d-1, an output circuit 1e-1 for charge control, an input circuit 1f-1 for charge control, a voltage detector 1g-1, a logic circuit 1h-1, and a control circuit 1i-1.

The charge and discharge control circuit 1-2 has a configuration similar to that of the charge and discharge control circuit 1-1. Specifically, the charge and discharge control circuit 1-2 includes an output terminal 1A-2 for discharge control, an input terminal 1B-2 for discharge control, an output terminal 1C-2 for charge control, an input terminal 1D-2 for charge control, a first power supply terminal 1E-2, a second power supply terminal 1F-2, an output circuit 1a-2 for discharge control, an input circuit 1b-2 for discharge control, a voltage detector 1c-2, a logic circuit 1d-2, an output circuit 1e-2 for charge control, an input circuit 1f-2 for charge control, a voltage detector 1g-2, a logic circuit 1h-2, and a control circuit 1i-2.

In the example illustrated in FIG. 1, the charge and discharge control circuits having the same configuration are used as the charge and discharge control circuit 1-1 and the charge and discharge control circuit 1-2. As another example, for example, a charge and discharge control circuit having a configuration in which the input circuit 1f-2 for charge control, the voltage detector 1g-2, the logic circuit 1h-2, the input circuit 1b-2 for discharge control, the voltage detector 1c-2, and the logic circuit 1d-2 are omitted from the charge and discharge control circuit 1-2 may be used as the charge and discharge control circuit 1-2.

In the example illustrated in FIG. 1, the first power supply terminal 1E-1 of the charge and discharge control circuit 1-1 is connected to the first electrode 2a-1 of the secondary battery 2-1. The voltage at the first power supply terminal 1E-1 is a high-potential power supply voltage VDD1 in the charge and discharge control circuit 1-1. The high-potential power supply voltage VDD1 is also referred to as "first power supply voltage" of the secondary battery 2-1. The second power supply terminal 1F-1 is connected to the second electrode 2b-1 of the secondary battery 2-1. The voltage at the second power supply terminal 1F-1 is a low-potential power supply voltage VSS1 in the charge and discharge control circuit 1-1. The low-potential power supply voltage VSS1 is also referred to as "second power supply voltage" of the secondary battery 2-1. The charge and discharge control circuit 1-1 operates between the power supply voltage VDD1 and the power supply voltage VSS1.

The output terminal 1A-1 for discharge control is connected to a gate terminal of the MOS transistor 4 for discharge control. Further, the output terminal 1A-1 for discharge control is connected to the output circuit 1a-1 for discharge control. The output circuit 1a-1 for discharge control is connected to the control circuit 1i-1.

The input terminal 1B-1 for discharge control is connected to the output terminal 1A-2 for discharge control of the charge and discharge control circuit 1-2 via the resistor 3a. Further, the input terminal 1B-1 for discharge control is connected to the input circuit 1b-1 for discharge control and the voltage detector 1c-1. The input circuit 1b-1 for discharge control and the voltage detector 1c-1 are connected to the logic circuit 1d-1. The logic circuit 1d-1 is connected to the control circuit 1i-1.

The output terminal 1C-1 for charge control is connected to a gate terminal of the MOS transistor 5 for charge control. Further, the output terminal 1C-1 for charge control is connected to the output circuit 1e-1 for charge control. The output circuit 1e-1 for charge control is connected to the control circuit 1i-1.

The input terminal 1D-1 for charge control is connected to the output terminal 1C-2 for charge control of the charge and discharge control circuit 1-2 via the resistor 3b. Further, the input terminal 1D-1 for charge control is connected to the input circuit 1f-1 for charge control and the voltage detector 1g-1. The input circuit 1f-1 for charge control and the voltage detector 1g-1 are connected to the logic circuit 1h-1. The logic circuit 1h-1 is connected to the control circuit 1i-1.

The first power supply terminal 1E-1 and the second power supply terminal 1F-1 are connected to the control circuit 1i-1.

In the example illustrated in FIG. 1, the first power supply terminal 1E-2 of the charge and discharge control circuit 1-2 is connected to the first electrode 2a-2 of the secondary battery 2-2. The voltage at the first power supply terminal 1E-2 is a high-potential power supply voltage VDD2 in the charge and discharge control circuit 1-2. The high-potential power supply voltage VDD2 is also referred to as "first power supply voltage" of the secondary battery 2-2. The second power supply terminal 1F-2 is connected to the second electrode 2b-2 of the secondary battery 2-2. The voltage at the second power supply terminal 1F-2 is a low-potential power supply voltage VSS2 in the charge and discharge control circuit 1-2. The low-potential power supply voltage VSS2 is also referred to as the second power supply voltage of the secondary battery 2-2. The power supply voltage VSS2 is equal to the power supply voltage VDD1. The charge and discharge control circuit 1-2 operates between the power supply voltage VDD2 and the power supply voltage VSS2.

The output terminal 1A-2 for discharge control is connected to the output circuit 1a-2 for discharge control. The output circuit 1a-2 for discharge control is connected to the control circuit 1i-2.

The power supply voltage VSS2 is provided to the input terminal 1B-2 for discharge control. Further, the input terminal 1B-2 for discharge control is connected to the input circuit 1b-2 for discharge control and the voltage detector 1c-2. The input circuit 1b-2 for discharge control and the voltage detector 1c-2 are connected to the logic circuit 1d-2. The logic circuit 1d-2 is connected to the control circuit 1i-2.

The output terminal 1C-2 for charge control is connected to the output circuit 1e-2 for charge control. The output circuit 1e-2 for charge control is connected to the control circuit 1i-2.

The power supply voltage VSS2 is provided to the input terminal 1D-2 for charge control. The input terminal 1D-2 for charge control is connected to the input circuit 1f-2 for charge control and the voltage detector 1g-2. The input circuit 1f-2 for charge control and the voltage detector 1g-2 are connected to the logic circuit 1h-2. The logic circuit 1h-2 is connected to the control circuit 1i-2.

The first power supply terminal 1E-2 and the second power supply terminal 1F-2 are connected to the control circuit 1i-2.

In the example illustrated in FIG. 1, the output circuit 1a-1 for discharge control outputs a discharge control signal (power supply voltage VDD1 or power supply voltage VSS1) for controlling the MOS transistor 4 for discharge control. The input circuit 1b-1 for discharge control outputs a discharge control input signal based on a signal input to the input terminal 1B-1 for discharge control. The voltage detector 1c-1 outputs an H-level signal (power supply voltage VDD1) when the voltage at the input terminal 1B-1 for discharge control is equal to or higher than the power supply voltage VDD1, and outputs an L-level signal (power supply voltage VSS1) when the voltage at the input terminal 1B-1 for discharge control is lower than the power supply voltage VDD1. In this example, the signal input to the input terminal 1B-1 for discharge control is the power supply voltage VDD2 or the power supply voltage VSS2. Both of the power supply voltage VDD2 and the power supply voltage VSS2 have voltage values that are equal to or higher than that of the power supply voltage VDD1. The voltage detector 1c-1 therefore always outputs the H-level signal (power supply voltage VDD1). The logic circuit 1d-1 outputs, to the control circuit 1i-1, a signal corresponding to a logical AND of an output signal output from the voltage detector 1c-1 and a discharge control input signal output from the input circuit 1b-1 for discharge control.

The output circuit 1e-1 for charge control outputs a charge control signal (power supply voltage VDD1 or power supply voltage VSS1) for controlling the MOS transistor 5 for charge control. The input circuit 1f-1 for charge control outputs a charge control input signal. The voltage detector 1g-1 outputs an H-level signal (power supply voltage VDD1) when the voltage at the input terminal 1D-1 for charge control is equal to or higher than the power supply voltage VDD1, and outputs an L-level signal (power supply voltage VSS1) when the voltage at the input terminal 1D-1 for charge control is lower than the power supply voltage VDD1. In this example, the signal input to the input terminal 1D-1 for charge control is the power supply voltage VDD2 or the power supply voltage VSS2. Both of the power supply voltage VDD2 and the power supply voltage VSS2 have voltage values that are equal to or higher than that of the power supply voltage VDD1. The voltage detector 1g-1 therefore always outputs the H-level signal (power supply voltage VDD1) similarly to the voltage detector 1c-1. The logic circuit 1h-1 outputs, to the control circuit 1i-1, a signal corresponding to a logical AND of an output signal output from the voltage detector 1g-1 and a charge control input signal output from the input circuit 1f-1 for charge control.

The control circuit 1i-1 controls the output circuit 1a-1 for discharge control and the output circuit 1e-1 for charge control.

In the example illustrated in FIG. 1, the output circuit 1a-2 for discharge control outputs a discharge control signal (power supply voltage VDD2 or power supply voltage VSS2) for controlling the MOS transistor 4 for discharge control. A signal output from the output circuit 1a-2 for discharge control is provided to the input circuit 1b-1 for discharge control of the charge and discharge control circuit 1-1.

The input circuit 1b-2 for discharge control outputs a discharge control input signal based on the power supply voltage VSS2 input to the input terminal 1B-2 for discharge control.

The voltage detector 1c-2 outputs an H-level signal (power supply voltage VDD2) when the voltage at the input terminal 1B-2 for discharge control is equal to or higher than the power supply voltage VDD2, and outputs an L-level signal (power supply voltage VSS2) when the voltage at the input terminal 1B-2 for discharge control is lower than the power supply voltage VDD2. In this example, the power supply voltage VSS2 is provided to the input terminal 1B-2 for discharge control, and hence the voltage detector 1c-2 always outputs the L-level signal (power supply voltage VSS2). The logic circuit 1d-2 outputs, to the control circuit 1i-2, a signal corresponding to a logical AND of an output signal output from the voltage detector 1c-2 and a discharge control input signal output from the input circuit 1b-2 for discharge control.

The output circuit 1e-2 for charge control outputs a charge control signal (power supply voltage VDD2 or power supply voltage VSS2) for controlling the MOS transistor 5 for charge control. A signal output from the output circuit 1e-2 for charge control is provided to the input circuit 1f-1 for charge control of the charge and discharge control circuit 1-1.

The input circuit 1f-2 for charge control outputs a charge control input signal based on the power supply voltage VSS2 input to the input terminal 1D-2 for charge control.

The voltage detector 1g-2 outputs an H-level signal (power supply voltage VDD2) when the voltage at the input terminal 1D-2 for charge control is equal to or higher than the power supply voltage VDD2, and outputs an L-level signal (power supply voltage VSS2) when the voltage at the input terminal 1D-2 for charge control is lower than the power supply voltage VDD2. In this example, the power supply voltage VSS2 is provided to the input terminal 1D-2 for charge control, and hence the voltage detector 1g-2 always outputs the L-level signal (power supply voltage VSS2) similarly to the voltage detector 1c-2. The logic circuit 1h-2 outputs, to the control circuit 1i-2, a signal corresponding to a logical AND of an output signal output from the voltage detector 1g-2 and a charge control input signal output from the input circuit 1f-2 for charge control.

The control circuit 1i-2 controls the output circuit 1a-2 for discharge control and the output circuit 1e-2 for charge control.

In the example illustrated in FIG. 1, the charge and discharge control circuit 1-1 and the charge and discharge control circuit 1-2 are cascade-connected to each other to be used. The charge and discharge control circuit 1-1 and the charge and discharge control circuit 1-2 control charge and discharge of the secondary battery 2-1 and charge and discharge of the secondary battery 2-2, respectively.

In the example illustrated in FIG. 1, two charge and discharge control circuits 1-1 and 1-2 are cascade-connected to each other to be used. As another example, three or more charge and discharge control circuits may be cascade-connected to each other to be used.

Figure 2:
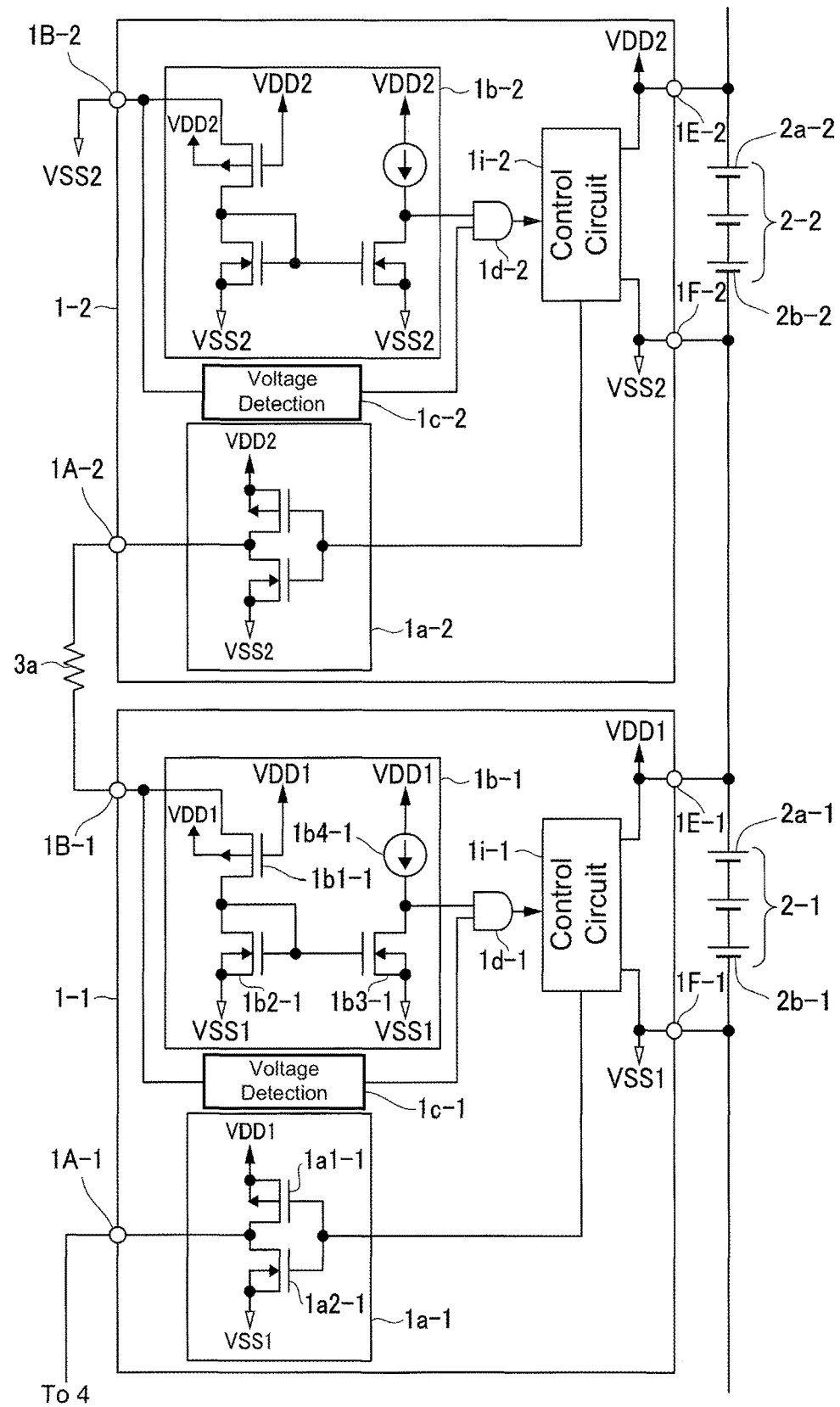
FIG. 2 is a diagram for illustrating an example of details of an output circuit for discharge control and an input circuit for discharge control illustrated in FIG. 1.

FIG. 2 is a diagram for illustrating an example of details of the output circuit 1a-1 for discharge control, the input circuit 1b-1 for discharge control, and other circuits illustrated in FIG. 1.

In the example illustrated in FIG. 2, the output circuit 1a-1 for discharge control includes a PMOS transistor 1a1-1 and an NMOS transistor 1a2-1. A gate terminal of the PMOS transistor 1a1-1 and a gate terminal of the NMOS transistor 1a2-1 are connected to the control circuit 1i-1. A drain terminal of the PMOS transistor 1a1-1 and a drain terminal of the NMOS transistor 1a2-1 are connected to the output terminal 1A-1 for discharge control.

The power supply voltage VDD1 is supplied to a source terminal of the PMOS transistor 1a1-1. The power supply voltage VSS1 is supplied to a source terminal of the NMOS transistor 1a2-1.

In the example illustrated in FIG. 2, when the charge and discharge control circuit 1-1 allows the discharge (when the charge and discharge control circuit 1-1 does not detect the overdischarge of the secondary battery 2-1), the control circuit 1i-1 outputs the L-level signal (power supply voltage VSS1) to the output circuit 1a-1 for discharge control. In this manner, the output circuit 1a-1 for discharge control outputs the H-level signal (power supply voltage VDD1) to the gate terminal of the MOS transistor 4 for discharge control. As a result, the MOS transistor 4 for discharge control is turned on.

Further, when the charge and discharge control circuit 1-2 allows the discharge (when the charge and discharge control circuit 1-2 does not detect the overdischarge of the secondary battery 2-2), the output circuit 1a-2 for discharge control of the charge and discharge control circuit 1-2 which is formed similarly to the output circuit 1a-1 for discharge control of the charge and discharge control circuit 1-1 receives the L-level signal (power supply voltage VSS2) output from the control circuit 1i-2 and outputs the H-level signal (power supply voltage VDD2) to the output terminal 1A-2 for discharge control.

Meanwhile, when the charge and discharge control circuit 1-1 inhibits the discharge (when the charge and discharge control circuit 1-1 detects the overdischarge of the secondary battery 2-1), the control circuit 1i-1 outputs the H-level signal (power supply voltage VDD1) to the output circuit 1a-1 for discharge control. In this manner, the output circuit 1a-1 for discharge control outputs the L-level signal (power supply voltage VSS1) to the gate terminal of the MOS transistor 4 for discharge control. As a result, the MOS transistor 4 for discharge control is turned off.

Further, when the charge and discharge control circuit 1-2 inhibits the discharge (when the charge and discharge control circuit 1-2 detects the overdischarge of the secondary battery 2-2), the output circuit 1a-2 for discharge control of the charge and discharge control circuit 1-2 receives the H-level signal (power supply voltage VDD2) output from the control circuit 1i-2 and outputs the L-level signal (power supply voltage VSS2) to the output terminal 1A-2 for discharge control.

In the example illustrated in FIG. 2, the input circuit 1b-1 for discharge control includes a PMOS transistor 1b1-1, an NMOS transistor 1b2-1, an NMOS transistor 1b3-1 current-mirror-connected to the NMOS transistor 1b2-1, and a constant current source 1b4-1.

A source terminal of the PMOS transistor 1b1-1 is connected to the input terminal 1B-1 for discharge control. A drain terminal of the PMOS transistor 1b1-1 is connected to a drain terminal of the NMOS transistor 1b2-1, a gate terminal of the NMOS transistor 1b2-1, and a gate terminal of the NMOS transistor 1b3-1. A drain terminal of the NMOS transistor 1b3-1 is connected to one terminal of the constant current source 1b4-1. Further, the drain terminal of the NMOS transistor 1b3-1 is connected to the control circuit 1i-1 via the logic circuit 1d-1.

The power supply voltage VDD1 is supplied to a gate terminal of the PMOS transistor 1b1-1. The power supply voltage VSS1 is supplied to a source terminal of the NMOS transistor 1b2-1. The power supply voltage VSS1 is supplied to a source terminal of the NMOS transistor 1b3-1. The power supply voltage VDD1 is supplied to another terminal of the constant current source 1b4-1.

In the example illustrated in FIG. 2, when both of the charge and discharge control circuit 1-1 and the charge and discharge control circuit 1-2 allow the discharge (when the charge and discharge control circuit 1-1 and the charge and discharge control circuit 1-2 do not detect the overdischarge of the secondary battery 2-1 and the overdischarge of the secondary battery 2-2, respectively), as described above, the output circuit 1a-2 for discharge control of the charge and discharge control circuit 1-2 outputs the power supply voltage VDD2 as the H-level signal, and hence the PMOS transistor 1b1-1 is turned on. In this manner, the NMOS transistor 1b2-1 and the NMOS transistor 1b3-1 are also turned on. As a result, the input circuit 1b-1 for discharge control outputs the power supply voltage VSS1 being the voltage at the source terminal of the NMOS transistor 1b3-1 to the logic circuit 1*d*-1 as the L-level signal. The L-level signal being the output of the logic circuit 1*d*-1 is thus input to the control circuit 1*i*-1. In this manner, the control circuit 1*i*-1 outputs the L-level signal (power supply voltage VSS1) to the output circuit 1*a*-1 for discharge control, and hence the MOS transistor 4 for discharge control is turned on.

In the example illustrated in FIG. 2, when the charge and discharge control circuit 1-1 allows the discharge but the charge and discharge control circuit 1-2 inhibits the discharge (when the charge and discharge control circuit 1-1 does not detect the overdischarge of the secondary battery 2-1 but the charge and discharge control circuit 1-2 detects the overdischarge of the secondary battery 2-2), as described above, the output circuit 1*a*-2 for discharge control of the charge and discharge control circuit 1-2 outputs the power supply voltage VSS2 as the L-level signal. The power supply voltage VSS2 is equal to the power supply voltage VDD1, and hence the PMOS transistor 1*b*1-1 is turned off. In this manner, the NMOS transistor 1*b*2-1 and the NMOS transistor 1*b*3-1 are also turned off. As a result, the input circuit 1*b*-1 for discharge control outputs the H-level signal (power supply voltage VDD1) to the logic circuit 1*d*-1. The H-level signal being the output of the logic circuit 1*d*-1 is thus input to the control circuit 1*i*-1. In this manner, the control circuit 1*i*-1 outputs the H-level signal (power supply voltage VDD1) to the output circuit 1*a*-1 for discharge control, and hence the MOS transistor 4 for discharge control is turned off.

That is, when the charge and discharge control circuit 1-2 inhibits the discharge, the PMOS transistor 1*b*1-1, the NMOS transistor 1*b*2-1, and the NMOS transistor 1*b*3-1 are turned off so as to disconnect the current path passing from the power supply voltage VDD1 to the power supply voltage VSS1 via the PMOS transistor 1*b*1-1 and the NMOS transistor 1*b*2-1 and a current path passing from the power supply voltage VDD1 to the power supply voltage VSS1 via the constant current source 1*b*4-1 and the NMOS transistor 1*b*3-1. The power consumption of the charge and discharge control circuit 1-1 can thus be reduced.

Now, the reason why the voltage detectors 1*c*-1 and 1*c*-2 and the logic circuits 1*d*-1 and 1*d*-2 (AND circuits) are formed in the examples illustrated in FIG. 1 and FIG. 2 is described.

In the battery device 10, the highest voltage is the power supply voltage VDD2. Thus, only a voltage equal to or lower than the power supply voltage VDD2 may be input to the input terminal 1B-2 for discharge control, that is, the input circuit 1*b*-2 for discharge control of the charge and discharge control circuit 1-2. The input circuit 1*b*-2 for discharge control therefore always outputs the H-level signal (power supply voltage VDD2). When this output signal is directly input to the control circuit 1*i*-2, the charge and discharge control circuit 1-2 always outputs the L-level signal (power supply voltage VSS2) for inhibiting the discharge to the output terminal 1A-2 for discharge control, and thus the battery device 10 cannot normally operate.

In view of this, in the examples illustrated in FIG. 1 and FIG. 2, for example, the power supply voltage VSS2 is provided to the input terminal 1B-2 for discharge control as a voltage lower than the power supply voltage VDD2, and there are provided the voltage detector 1*c*-2 configured to output the L-level signal (power supply voltage VSS2) when detecting that a voltage lower than the power supply voltage VDD2 is provided to the input terminal 1B-2 for discharge control, and the logic circuit 1*d*-2 configured to output, to the control circuit 1*i*-2, the signal corresponding to the logical AND of the output signal output from the voltage detector 1*c*-2 and the discharge control input signal output from the input circuit 1*b*-2 for discharge control.

With the above-mentioned configuration, the logic circuit 1*d*-2 always outputs the L-level signal (power supply voltage VSS2). As a result, when the charge and discharge control circuit 1-2 allows the discharge (when the charge and discharge control circuit 1-2 does not detect the overdischarge of the secondary battery 2-2), the control circuit 1*i*-2 outputs the L-level signal (power supply voltage VSS2) to the output circuit 1*a*-2 for discharge control. In this manner, the output circuit 1*a*-2 for discharge control can output the H-level signal (power supply voltage VDD2) for allowing the discharge to the output terminal 1A-2 for discharge control.

Meanwhile, in the charge and discharge control circuit 1-1, the voltage input to the input terminal 1B-1 for discharge control is one of the power supply voltages VDD2 and VSS2.

When the output circuit 1*a*-2 for discharge control of the charge and discharge control circuit 1-2 inputs the power supply voltage VDD2 as the H-level signal for allowing the discharge to the input circuit 1*b*-1 for discharge control via the output terminal 1A-2 for discharge control and the input terminal 1B-1 for discharge control, the input circuit 1*b*-1 for discharge control outputs the L-level signal (power supply voltage VSS1) to the logic circuit 1*d*-1.

At this time, the voltage detector 1*c*-1 receives the power supply voltage VDD2 which is higher than the power supply voltage VDD1 and hence the voltage detector 1*c*-1 outputs the H-level signal (power supply voltage VDD1) to the logic circuit 1*d*-1.

The logic circuit 1*d*-1 thus outputs the L-level signal (power supply voltage VSS1) to the control circuit 1*i*-1. In this manner, when the charge and discharge control circuit 1-1 allows the discharge (when the charge and discharge control circuit 1-1 does not detect the overdischarge of the secondary battery 2-1), the control circuit 1*i*-1 outputs the L-level signal (power supply voltage VSS1) to the output circuit 1*a*-1 for discharge control. As a result, the H-level signal (power supply voltage VDD1) is supplied from the output terminal 1A-1 for discharge control, and the MOS transistor 4 for discharge control is turned on.

Further, when the output circuit 1*a*-2 for discharge control of the charge and discharge control circuit 1-2 inputs the power supply voltage VSS2 as the L-level signal for inhibiting the discharge to the input circuit 1*b*-1 for discharge control via the output terminal 1A-2 for discharge control and the input terminal 1B-1 for discharge control, the input circuit 1*b*-1 for discharge control outputs the H-level signal (power supply voltage VDD1) to the logic circuit 1*d*-1.

At this time, the voltage detector 1*c*-1 receives the power supply voltage VSS2 which is as high as the power supply voltage VDD1 and hence the voltage detector 1*c*-1 outputs the H-level signal (power supply voltage VDD1) to the logic circuit 1*d*-1.

The logic circuit 1*d*-1 thus outputs the H-level signal (power supply voltage VDD1) to the control circuit 1*i*-1. In this manner, even when the charge and discharge control circuit 1-1 allows the discharge (when the charge and discharge control circuit 1-1 does not detect the overdischarge of the secondary battery 2-1), the control circuit 1*i*-1 outputs the H-level signal (power supply voltage VDD1) to the output circuit 1*a*-1 for discharge control. As a result, the L-level signal (power supply voltage VSS1) is supplied from the output terminal 1A-1 for discharge control, and the MOS transistor 4 for discharge control is turned off.

Even when the voltage detector 1c-1 and the logic circuit 1d-1 are formed in the charge and discharge control circuit 1-1 as described above, the operation of the control circuit 1i-1 is not affected.

The charge and discharge control circuit 1-1 and the charge and discharge control circuit 1-2 can thus have the same configuration including the voltage detector 1c-1 and the logic circuit 1d-1 or including the voltage detector 1c-2 and the logic circuit 1d-2. Further, the battery device 10 can operate normally.

In the example illustrated in FIG. 1, the output circuit 1e-1 for charge control is configured similarly to the above-mentioned output circuit 1a-1 for discharge control. The input circuit 1f-1 for charge control is configured similarly to the above-mentioned input circuit 1b-1 for discharge control. The voltage detector 1g-1 is configured similarly to the above-mentioned voltage detector 1c-1. The logic circuit 1h-1 is configured similarly to the above-mentioned logic circuit 1d-1.

In this case, when the output circuit 1e-2 for charge control outputs the L-level signal (power supply voltage VSS2) for inhibiting the charge, similarly to the above-mentioned input circuit 1b-1 for discharge control, the current path passing from the power supply voltage VDD1 to the power supply voltage VSS1 in the input circuit 1f-1 for charge control is disconnected. The power consumption of the charge and discharge control circuit 1-1 can thus be reduced.

Figure 3:
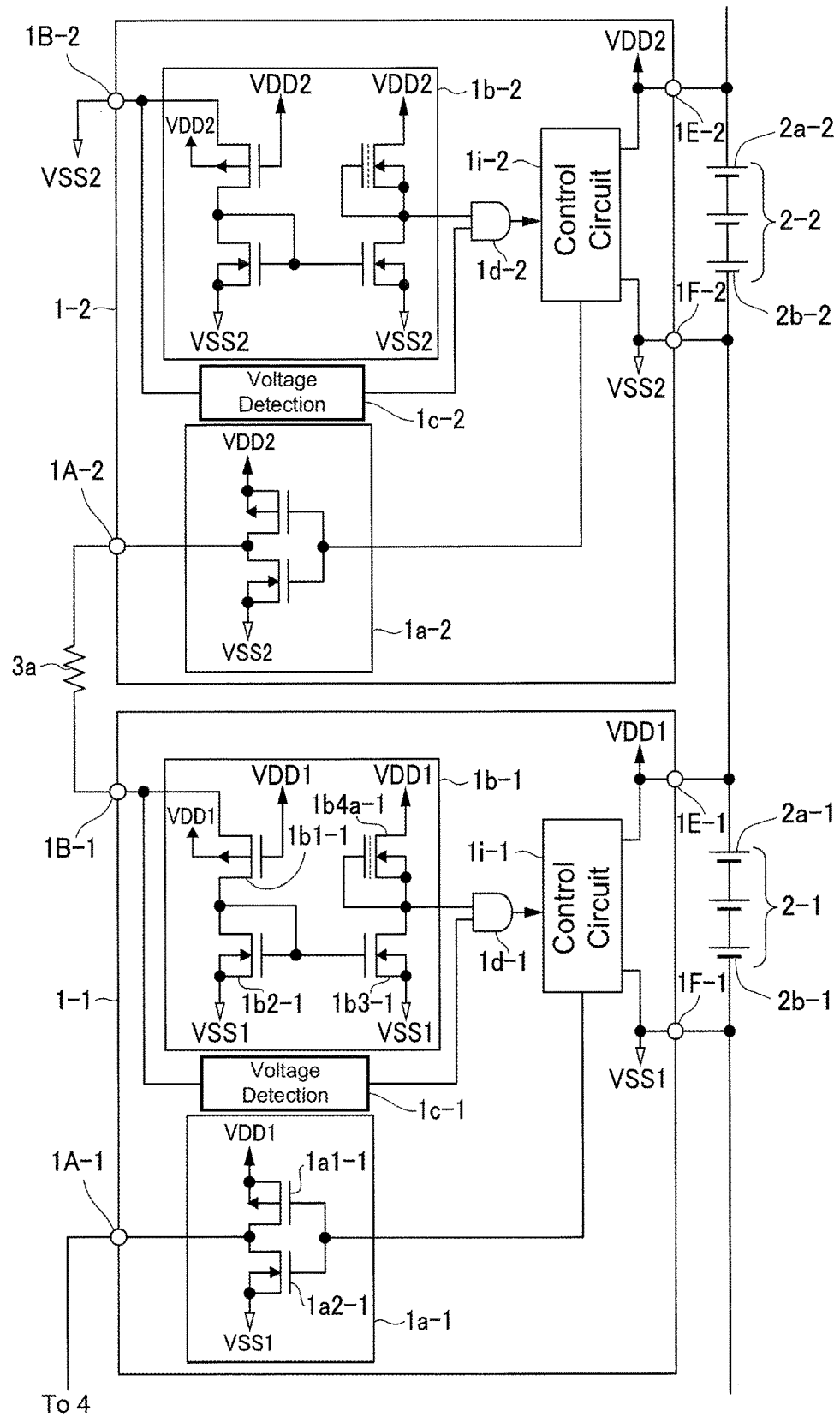
FIG. 3 is a diagram for illustrating a specific example of a constant current source illustrated in FIG. 2.

FIG. 3 is a diagram for illustrating a specific example of the constant current source 1b4-1 illustrated in FIG. 2.

In the example illustrated in FIG. 3, the constant current source 1b4-1 illustrated in FIG. 2 is formed of a depletion-type NMOS transistor 1b4a-1. A gate terminal and a source terminal of the depletion-type NMOS transistor 1b4a-1 are connected to the control circuit 1i-1 via the logic circuit 1d-1. The power supply voltage VDD1 is supplied to a drain terminal of the depletion-type NMOS transistor 1b4a-1.

In the example illustrated in FIG. 3, the depletion-type NMOS transistor 1b4a-1 is used as the constant current source 1b4-1, and hence a value of the current flowing through the NMOS transistor 1b3-1 can be accurately controlled to a desired value.

In the example illustrated in FIG. 3, the depletion-type NMOS transistor 1b4a-1 is used, but a resistor may be used instead as another example.

Figure 4:
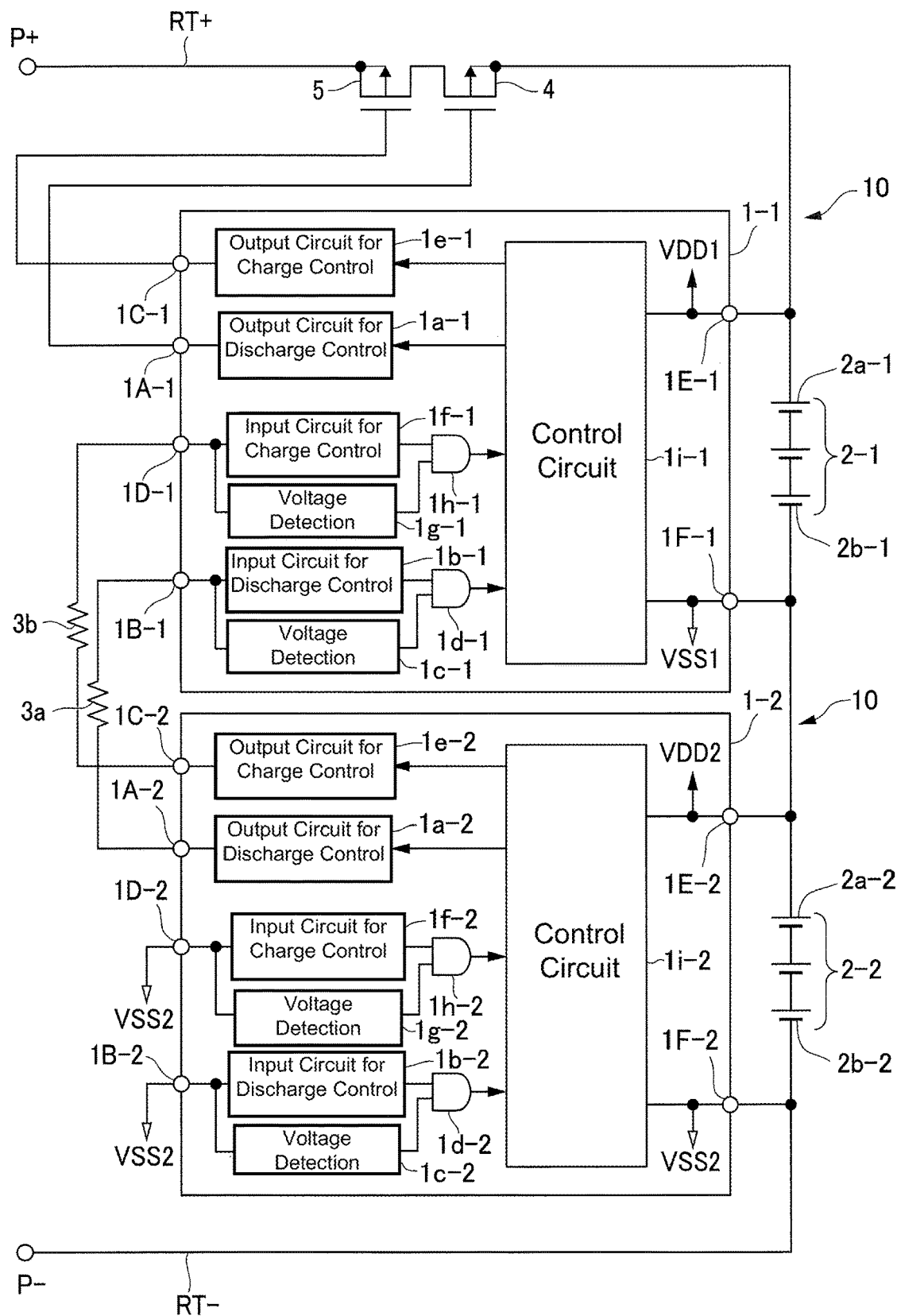
FIG. 4 is a diagram for illustrating a modification example of the battery device including the charge and discharge control circuit according to the embodiment of the present invention.
Figure 5:
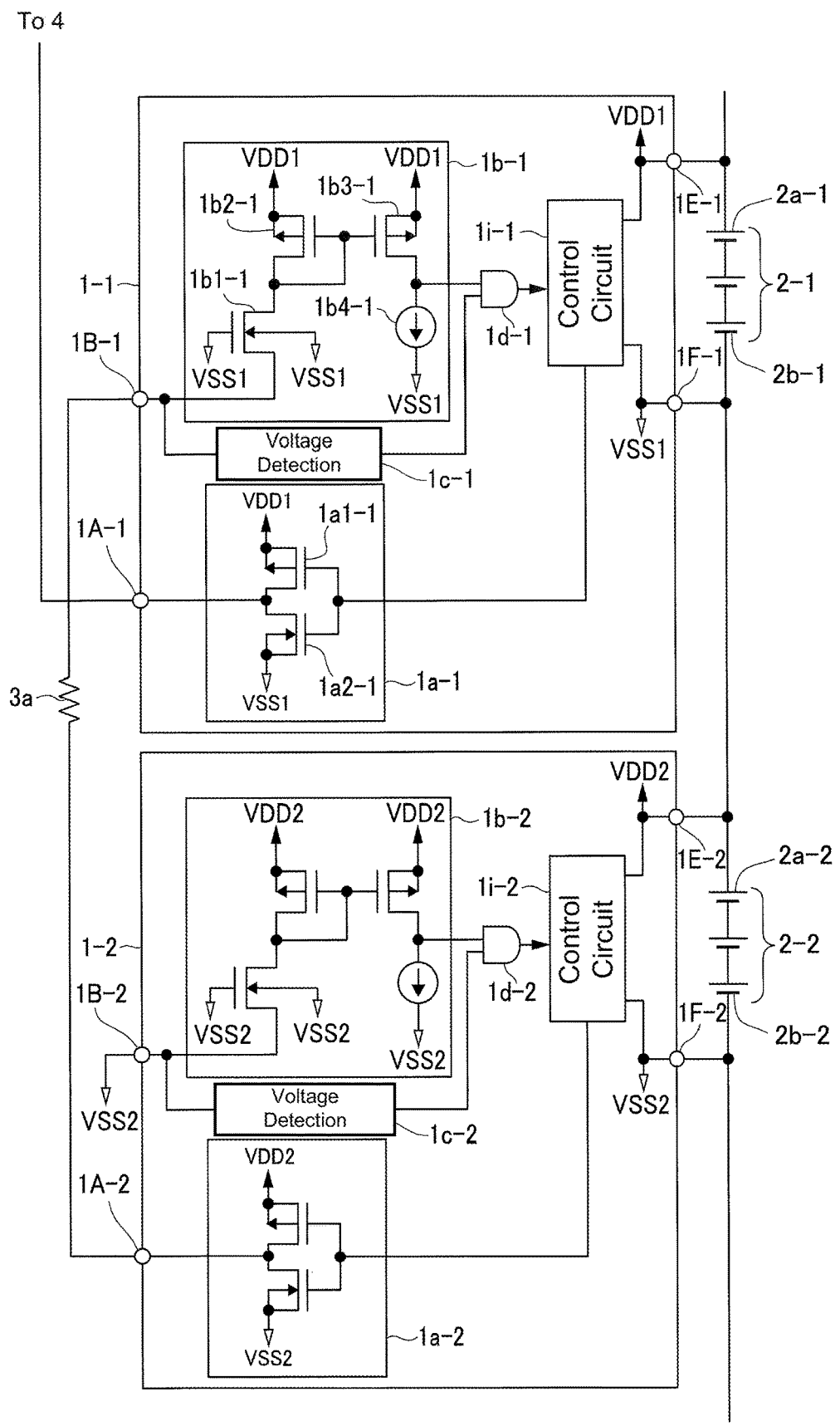
FIG. 5 is a diagram for illustrating an example of details of an output circuit for discharge control and an input circuit for discharge control illustrated in FIG. 4.

FIG. 4 is a diagram for illustrating a modification example of the battery device 10 including the charge and discharge control circuit 1-1 according to the embodiment of the present invention. FIG. 5 is a diagram for illustrating an example of details of the output circuit 1a-1 for discharge control, the input circuit 1b-1 for discharge control, and other circuits illustrated in FIG. 4.

In the example illustrated in FIG. 1, the MOS transistor 4 for discharge control and the MOS transistor 5 for charge control are formed of NMOS transistors, and are arranged in the low-side charge and discharge path RT−. Meanwhile, in the example illustrated in FIG. 4, the MOS transistor 4 for discharge control and the MOS transistor 5 for charge control are formed of PMOS transistors, and are arranged in the high-side charge and discharge path RT+.

In the example illustrated in FIG. 5, the input circuit 1b-1 for discharge control includes an NMOS transistor 1b1-1, a PMOS transistor 1b2-1, a PMOS transistor 1b3-1, and a constant current source 1b4-1.

A source terminal of the NMOS transistor 1b1-1 is connected to the input terminal 1B-1 for discharge control. A drain terminal of the NMOS transistor 1b1-1 is connected to a drain terminal of the PMOS transistor 1b2-1, a gate terminal of the PMOS transistor 1b2-1, and a gate terminal of the PMOS transistor 1b3-1. A drain terminal of the PMOS transistor 1b3-1 is connected to one terminal of the constant current source 1b4-1. Further, the drain terminal of the PMOS transistor 1b3-1 is connected to the control circuit 1i-1 via the logic circuit 1d-1.

The power supply voltage VSS1 is supplied to a gate terminal of the NMOS transistor 1b1-1. The power supply voltage VDD1 is supplied to a source terminal of the PMOS transistor 1b2-1. The power supply voltage VDD1 is supplied to a source terminal of the PMOS transistor 1b3-1. The power supply voltage VSS1 is supplied to another terminal of the constant current source 1b4-1.

The embodiment of the present invention and the modification thereof have been described above. However, the embodiment and the modification are presented as examples and are not intended to limit the scope of the invention. The embodiment and the modification may be implemented in other various modes, and various kinds of omissions, replacements, and modifications can be made without departing from the gist of the invention. The embodiment and the modification are included in the scope and gist of the invention, and are also included in the invention described in the appended claims and the scope of their equivalents. The embodiment and the modification described above can be combined with one another to suit individual cases.

What is claimed is:

1. A charge and discharge control circuit configured to control charge and discharge of a secondary battery and to operate between a first power supply voltage and a second power supply voltage of the secondary battery, the charge and discharge control circuit being configured to be used in a cascade-connection to a second charge and discharge control circuit configured to control charge and discharge of a second secondary battery connected in series to the secondary battery, and to operate between a first power supply voltage and a second power supply voltage of the second secondary battery, the charge and discharge control circuit, comprising:

an output circuit for discharge control configured to output a discharge control signal for controlling a MOS transistor for discharge control, the discharge control signal corresponding to the first power supply voltage of the secondary battery;

an output terminal for discharge control connected to an output of the output circuit for discharge control;

a control circuit configured to control the output circuit for discharge control;

an input circuit for discharge control configured to output a discharge control input signal to the control circuit; and an input terminal for discharge control connected to the input circuit for discharge control, and is connected to an output terminal for discharge control of the second charge and discharge control circuit, the input circuit for discharge control including:

a first MOS transistor of a first conductivity type having a source terminal connected to the input terminal for discharge control and a gate terminal for receiving the first power supply voltage of the secondary battery;

a second MOS transistor of a second conductivity type having a drain terminal and a gate terminal that are connected to a drain terminal of the first MOS transistor and a source terminal for receiving the second power supply voltage of the secondary battery; and
a third MOS transistor of the second conductivity type current-mirror-connected to the second MOS transistor, and having a drain terminal for outputting the discharge control input signal.

2. A charge and discharge control circuit according to claim 1,
wherein the input circuit for discharge control further includes a constant current source,
wherein the constant current source has one terminal connected to the drain terminal of the third MOS transistor, and
wherein the constant current source has another terminal for receiving the first power supply voltage of the secondary battery.

3. A charge and discharge control circuit according to claim 1, further comprising:
a voltage detector configured to detect a voltage of the input terminal for discharge control; and
a logic circuit configured to output, to the control circuit, a signal corresponding to a logical AND of an output signal output from the voltage detector and the discharge control input signal output from the input circuit for discharge control.

4. A charge and discharge control circuit according to claim 1, further comprising:
an output circuit for charge control configured to output a charge control signal for controlling a MOS transistor for charge control, the charge control signal corresponding to the first power supply voltage of the secondary battery;
an output terminal for charge control connected to an output of the output circuit for charge control;
an input circuit for charge control configured to output a charge control input signal to the control circuit; and
an input terminal for charge control connected to the input circuit for charge control, and is connected to an output terminal for charge control of the second charge and discharge control circuit,
wherein the control circuit is configured to control the output circuit for charge control, and
wherein the input circuit for charge control includes:
a fourth MOS transistor of the first conductivity type having a source terminal connected to the input terminal for charge control and a gate terminal for receiving the first power supply voltage of the secondary battery;
a fifth MOS transistor of the second conductivity type having a drain terminal and a gate terminal that are connected to a drain terminal of the fourth MOS transistor, and a source terminal for receiving the second power supply voltage of the secondary battery; and
a sixth MOS transistor of the second conductivity type current-mirror-connected to the fifth MOS transistor, and having a drain terminal for outputting the charge control input signal.

5. A battery device, comprising:
the charge and discharge control circuit of claim 1;
the second charge and discharge control circuit;
the secondary battery;
a discharge control switch configured to control discharge from the secondary battery; and
a charge control switch configured to control charge to the secondary battery.

6. A charge and discharge control circuit according to claim 2,
wherein the constant current source includes a depletion-type MOS transistor,
wherein the depletion-type MOS transistor has a source terminal and a gate terminal connected to the drain terminal of the third MOS transistor, and
wherein the depletion-type MOS transistor has a drain terminal for receiving the first power supply voltage of the secondary battery.

7. A charge and discharge control circuit according to claim 2, further comprising:
a voltage detector configured to detect a voltage of the input terminal for discharge control; and
a logic circuit configured to output, to the control circuit, a signal corresponding to a logical AND of an output signal output from the voltage detector and the discharge control input signal output from the input circuit for discharge control.

8. A charge and discharge control circuit according to claim 2, further comprising:
an output circuit for charge control configured to output a charge control signal for controlling a MOS transistor for charge control, the charge control signal corresponding to the first power supply voltage of the secondary battery;
an output terminal for charge control connected to an output of the output circuit for charge control;
an input circuit for charge control configured to output a charge control input signal to the control circuit; and
an input terminal for charge control connected to the input circuit for charge control, and is connected to an output terminal for charge control of the second charge and discharge control circuit,
wherein the control circuit is configured to control the output circuit for charge control, and
wherein the input circuit for charge control includes:
a fourth MOS transistor of the first conductivity type having a source terminal connected to the input terminal for charge control and a gate terminal for receiving the first power supply voltage of the secondary battery;
a fifth MOS transistor of the second conductivity type having a drain terminal and a gate terminal that are connected to a drain terminal of the fourth MOS transistor, and a source terminal for receiving the second power supply voltage of the secondary battery; and
a sixth MOS transistor of the second conductivity type current-mirror-connected to the fifth MOS transistor, and having a drain terminal for outputting the charge control input signal.

9. A battery device, comprising:
the charge and discharge control circuit of claim 2;
the second charge and discharge control circuit;
the secondary battery;
a discharge control switch configured to control discharge from the secondary battery; and
a charge control switch configured to control charge to the secondary battery.

10. A charge and discharge control circuit according to claim 3, further comprising:
an output circuit for charge control configured to output a charge control signal for controlling a MOS transistor for charge control, the charge control signal corresponding to the first power supply voltage of the secondary battery;

an output terminal for charge control connected to an output of the output circuit for charge control;

an input circuit for charge control configured to output a charge control input signal to the control circuit; and an input terminal for charge control connected to the input circuit for charge control, and is connected to an output terminal for charge control of the second charge and discharge control circuit, wherein the control circuit is configured to control the output circuit for charge control, and wherein the input circuit for charge control includes:
- a fourth MOS transistor of the first conductivity type having a source terminal connected to the input terminal for charge control and a gate terminal for receiving the first power supply voltage of the secondary battery;
- a fifth MOS transistor of the second conductivity type having a drain terminal and a gate terminal that are connected to a drain terminal of the fourth MOS transistor, and a source terminal for receiving the second power supply voltage of the secondary battery; and
- a sixth MOS transistor of the second conductivity type current-mirror-connected to the fifth MOS transistor, and having a drain terminal for outputting the charge control input signal.

11. A battery device, comprising:
the charge and discharge control circuit of claim 3;
the second charge and discharge control circuit;
the secondary battery;
a discharge control switch configured to control discharge from the secondary battery; and
a charge control switch configured to control charge to the secondary battery.

12. A battery device, comprising:
the charge and discharge control circuit of claim 4;
the second charge and discharge control circuit;
the secondary battery;
a discharge control switch configured to control discharge from the secondary battery; and
a charge control switch configured to control charge to the secondary battery.

13. A charge and discharge control circuit according to claim 6, further comprising:
a voltage detector configured to detect a voltage of the input terminal for discharge control; and
a logic circuit configured to output, to the control circuit, a signal corresponding to a logical AND of an output signal output from the voltage detector and the discharge control input signal output from the input circuit for discharge control.

14. A charge and discharge control circuit according to claim 6, further comprising:
an output circuit for charge control configured to output a charge control signal for controlling a MOS transistor for charge control, the charge control signal corresponding to the first power supply voltage of the secondary battery;

an output terminal for charge control connected to an output of the output circuit for charge control;

an input circuit for charge control configured to output a charge control input signal to the control circuit; and an input terminal for charge control connected to the input circuit for charge control, and is connected to an output terminal for charge control of the second charge and discharge control circuit, wherein the control circuit is configured to control the output circuit for charge control, and wherein the input circuit for charge control includes:
- a fourth MOS transistor of the first conductivity type having a source terminal connected to the input terminal for charge control and a gate terminal for receiving the first power supply voltage of the secondary battery;
- a fifth MOS transistor of the second conductivity type having a drain terminal and a gate terminal that are connected to a drain terminal of the fourth MOS transistor, and a source terminal for receiving the second power supply voltage of the secondary battery; and
- a sixth MOS transistor of the second conductivity type current-mirror-connected to the fifth MOS transistor, and having a drain terminal for outputting the charge control input signal.

15. A battery device, comprising:
the charge and discharge control circuit of claim 6;
the second charge and discharge control circuit;
the secondary battery;
a discharge control switch configured to control discharge from the secondary battery; and
a charge control switch configured to control charge to the secondary battery.

* * * * *